United States Patent
Tsai et al.

(10) Patent No.: US 7,177,467 B2
(45) Date of Patent: Feb. 13, 2007

(54) METHOD FOR ESTIMATING WHITE POINT SHIFT FOR AUTO WHITE BALANCE

(75) Inventors: Chih-hua Tsai, Hsinchu (TW); Wan-chi Lue, Yunlin (TW)

(73) Assignee: Novatek Microelectronics Corp., Hsinchu (TW)

( * ) Notice: Subject to any disclaimer, the term of this patent is extended or adjusted under 35 U.S.C. 154(b) by 729 days.

(21) Appl. No.: 10/248,373

(22) Filed: Jan. 15, 2003

(65) Prior Publication Data
US 2004/0090536 A1 May 13, 2004

(30) Foreign Application Priority Data
Nov. 12, 2002 (TW) .................. 91133111 A

(51) Int. Cl.
*G06K 9/00* (2006.01)
(52) U.S. Cl. ............... 382/167; 382/162; 382/289; 382/293; 382/296
(58) Field of Classification Search ........... 382/167, 382/162, 289, 293, 296; 358/1.9, 3.23, 518, 358/521; 348/384.1, 390.1, 744, 750; 359/238
See application file for complete search history.

(56) References Cited

U.S. PATENT DOCUMENTS

| | | | | |
|---|---|---|---|---|
| 4,623,973 A | * | 11/1986 | Hoffrichter et al. | 382/167 |
| 6,674,561 B2 | * | 1/2004 | Ohnishi et al. | 359/238 |
| 6,868,179 B2 | * | 3/2005 | Gruzdev et al. | 382/167 |
| 7,009,733 B2 | * | 3/2006 | Gruzdev et al. | 358/1.9 |

\* cited by examiner

*Primary Examiner*—Anh Hong Do
(74) *Attorney, Agent, or Firm*—Jianq Chyun IP Office

(57) ABSTRACT

A method of estimating shift of white balance point. According to characteristics of a photograph sensing apparatus, a white-point plane of a YIQ color coordinate is determined. The white-point plane has a normal direction pointing one of the axis of the YIQ color coordinate. The white-point plane is thus perpendicular to such axis with a one-dimensional one-spot value. Consequently, a YIQ image data described by the YIQ color coordinate is obtained. The same rotation operation is performed to rotate the YIQ image data to obtain a one-dimensional image value. The one-dimensional image value is compared to the one-dimensional white-point value to obtain a differential value, so as to estimate the white-point shift. In the above method, the axis of the YIQ color coordinate includes the Y-axis after rotation.

13 Claims, 5 Drawing Sheets

US 7,177,467 B2

METHOD FOR ESTIMATING WHITE POINT SHIFT FOR AUTO WHITE BALANCE

CROSS REFERENCE TO RELATED APPLICATIONS

This application claims the priority benefit of Taiwan application serial no. 91133111, filed Nov. 12, 2002.

BACKGROUND OF INVENTION

1. Field of the Invention

The invention relates in general to an image color correction technique, and more particularly, to an estimation method of white-point shift for white balance suitable for use to correct white balance of a color image sensing apparatus.

2. Related Art of the Invention

Along with the development of image processing technique, sensing photographic technique and the variation of information communication, the image photographic device has become a necessary information appliance of our daily lives. For example, the actual image can be photographed and replayed later. Lately, the highly developed digital image photographic technique that records the image in pixel units, and stores and displays the image in digital form has advanced the popularity of digital cameras or digital camcorders as the color image is the information that we cannot avoid for our lives.

A color image is basically mixed by three primary colors, that is, red (R), green (G) and blue (B). Regardless the blackbody radiation factor, a white point is formed of a mixture of isometric R, G and B lights as shown in FIG. 1. When R, G and B lights are weighted differently, different color is produced. In FIG. 1, the line between the white point (1,1,1) and the black point (0,0,0) indicates the gray level.

When the characteristic of actual image sensing device is taken into account, the white point is deviated from that as illustrated in FIG. 1. The hardware design of the sensing device has various color responses. Further, under different light sources such as natural light source or artificial light source, different color responses are resulted under the influence of color temperature. For example, when the color temperature of the light source is as low as about 2850° K, the color approaches to red and white. In contrast, when the color temperature of the light source is increased up to about 8500° K, the color tends to be blue. The color differences affect the image color fidelity.

Therefore, how to locate the white point under various color temperatures and how to estimate tone and white balance point shifts are essential for color calibration.

Based on the color principles, colors have been illustrated according to the characteristics of a variety of color coordinates. Currently, in addition to the RGB coordinate, transformation matrix is readily applied between other commonly seen color coordinates such as CYM, CYMK, HIS, HSV, YCbCr, YUV and YIQ coordinates.

To resolve the problem of white balance, the YCbCr coordinate (Y is the brightness component, Cb is the blue component, Cr is the red component) is typically used to perform color analysis because a better compression effect can be obtained for typical JPEG pictures by the YCbCr illustration. As shown in FIG. 2, the white point is deflected into a curved surface in accordance with the variation of color temperature. For a particular brightness, the white point varies along a curve. For different brightness, the curvature of the curve is different. Therefore, the white point thus constructs an irregular curved surface in the YCbCr coordinated. However, it is difficult to transform the curved surface of white point in the YCbCr coordinate into a mathematic formula.

SUMMARY OF INVENTION

The present invention further provides a method for estimating white balance point shift. The estimation of white balance point is simplified by using the physical characteristic of the YIQ coordinate. Further, the present invention is not affected by the ambient color temperature.

The estimation method provided by the present invention includes the following steps as is shown in FIG. 7. According to the design condition of a photographic device, a white-point plane of a YIQ color coordinate is determined. The normal direction of the white-point plane is inclined from one of a YQ plane and the YI plane of the YIQ color coordinate by a first angle. The normal direction is inclined from an original Y-axis of the YIQ coordinate by a second angle. According to the first and second angles, a coordinate rotation computation is performed to obtain a rotated YIQ color coordinate. Thereby, the normal direction overlaps with the Y-axis of the rotated YIQ color coordinate; and consequently, the white point plane is perpendicular to the Y-axis of the rotated YIQ color coordinate. A Y-axis white-point value is obtained, and a YIQ image data illustrated by the YIQ color coordinate is thus obtained. According to the first and second angles, the same rotation computation is performed to rotate the YIQ image data to the rotated YIQ color coordinate, such that a Y-axis image value is obtained. A difference between the Y-axis value and the Y-axis white-point value is calculated to estimate the white point shift.

In the above estimation method, the coordination rotation computation includes perform a offset of an IQ plane of the YIQ color coordinate.

The above estimation method further comprises a step of transform an image of an RGB color coordinate or a CYM color coordinate into the YIQ image data illustrated by the YIQ color coordinate.

In one embodiment of the present invention, the method for estimating white balance point shift includes determining a white-point plane of a YIQ color coordinate. A rotation operation is performed on the YIQ color coordinate, such that a normal direction of the white-point plane is pointing an axis of the rotated YIQ color coordinate. Meanwhile, the white-point plane is perpendicular to the axis with a one-dimensional white-point value of the axis. Meanwhile, a YIQ image data illustrated by the YIQ color coordinate can be obtained. The same rotation operation is performed to rotate the YIQ image data to obtain a one-dimensional image value. The difference between the one-dimensional white-point value and the one-dimensional image value are then obtained to estimate the white point shift. In the above estimation method, the axis includes the Y-axis of the rotated YIQ color coordinate.

BRIEF DESCRIPTION OF DRAWINGS

These, as well as other features of the present invention, will become more apparent upon reference to the drawings wherein.

DETAILED DESCRIPTION

Figure 1:
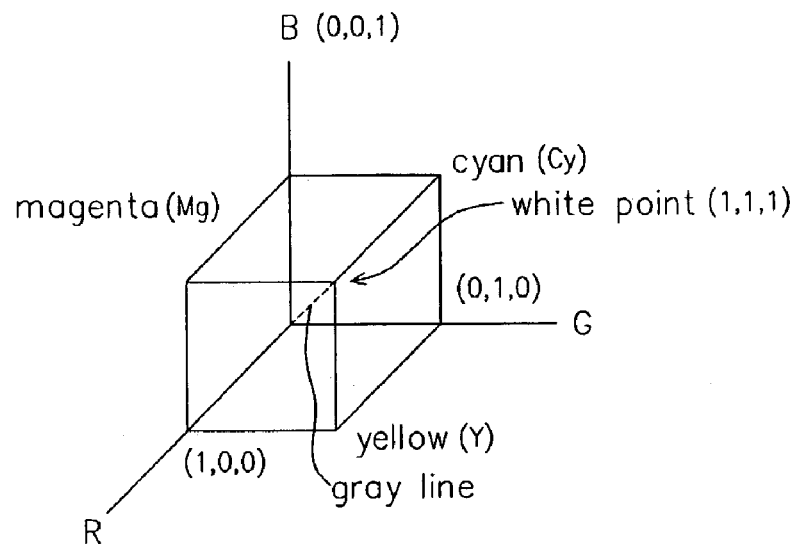
FIG. 1 shows an RGB color coordinate.
Figure 2:
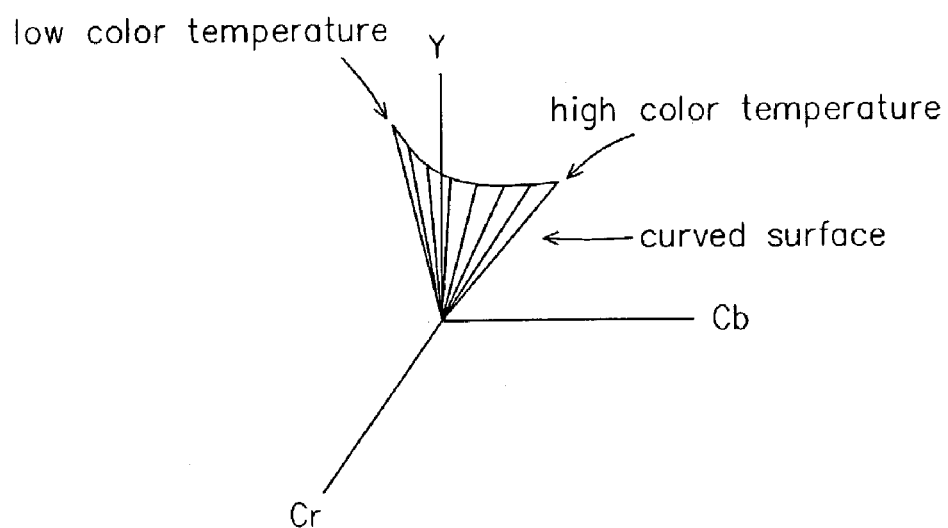
FIG. 2 shows a YCbCr color coordinate and the white-point variation in response to color temperature on the YCbCr plane.

The present invention provides a simplified method for estimating the white balance point according to the physical characteristics of the white balance point in the YIQ color coordinate. Thereby, the error caused by the color temperature is minimized.

Currently, an effective way to estimate the shift between the color to be calibrated and the white balance point has not been developed. Therefore, in the conventional color calibration method, errors caused by the variation of color temperature often occur to the calibration result.

In the present invention, various color spaces or color coordinates have been investigated to find out that a specific physical characteristic of the YIQ color coordinate is particular useful for estimating the white balance point shift. The YIQ color coordinate has three axes representing three components of colors, where Y indicates the brightness component, I indicates the in-phase component, and Q indicates the quadrature component. The transformation relationship between YIQ color coordinate and the RGB color coordinate is expressed as:

$$\begin{bmatrix} Y \\ I \\ Q \end{bmatrix} = \begin{bmatrix} 0.299 & 0.587 & 0.114 \\ 0.596 & -0.275 & -0.321 \\ 0.212 & -0.523 & 0.311 \end{bmatrix} \begin{bmatrix} R \\ G \\ B \end{bmatrix} \quad (1)$$

$$\begin{bmatrix} R \\ G \\ B \end{bmatrix} = \begin{bmatrix} 1.0 & 0.956 & 0.621 \\ 1.0 & -2.272 & -0.647 \\ 1.0 & -1.106 & -1.703 \end{bmatrix} \begin{bmatrix} Y \\ I \\ Q \end{bmatrix} \quad (2)$$

Among other color coordinates, the YUV color coordinate is similar to the YIQ color coordinate. The difference between the YUV color coordinate and the YIQ color coordinated can be expressed as:

$I=0.74V-0.27U$ $Q=0.48V+0.41U$

Therefore, the characteristic illustrated as follows can also be applied to the YUV color coordinate. It is known that a variety of color coordinates are available to illustrate an image, while transformations between the color coordinates are readily applicable. The present invention exemplarily provides the estimation methods for YIQ/YUV color coordinates, while the present invention can also be applied to other color coordinates by transforming image illustrated in other color coordinates into to the YIQ/YUV color coordinates.

Based on the research result, it is found that white point varies as color temperature and brightness change. As shown in FIG. 3, a white-point plane 100 can be constructed in the YIQ color coordinate for various color temperatures. In the YIQ color coordinate, the color temperature varies along a straight line of color temperature axis. For a particular color temperature such as T2, a white-point gray line 102 is constructed by the white points. These white-point gray lines thus construct the white-point plane 100. The white-point plane 100 has a normal direction 104 perpendicular to the white-point plane 100.

Either the white-point plane 100 or the normal direction 104 is inclined in the YIQ color coordinate. The inclination is determined by the characteristic parameters and operation conditions of the image sensing device, and can be determined by conventional measurements. In this present invention, the inclination of the white-point plane 100 is required, while the way to determine the inclination is not limited to any specific method.

The normal direction 104 of the white-point plane 100 is inclined from the three axes Y, I, and Q of the YIQ color coordinate by respective angles. It is found in the present invention that the white-point plane 100 as a function of color temperature can be represented by a mathematic formula in the YIQ color coordinate. Therefore, when a color image point such as a pixel or an area of the image is to be calibrated, and the color image point deviates from the white-point plane 100 by a distance, the calibration level and calibration mode can be estimated according to the magnitude and direction of the distance. For example, a weight can be determined in response to the distance to perform statistics or analysis.

Therefore, the present invention uses the YIQ color coordinate to illustrate color, so as to obtain a white-point plane 100. Thereby, the estimation of the white-point shift for the color is simplified into calculation of distance between the color point to be analyzed and the white-point plane 100. Thereafter, according to the color calibration mode, an appropriate weight is determined to perform analysis. However, the distance to the white-point plane 100 is calculated in three dimensions. Therefore, simplification of the computation method is further provided by the present invention.

Figure 3A:
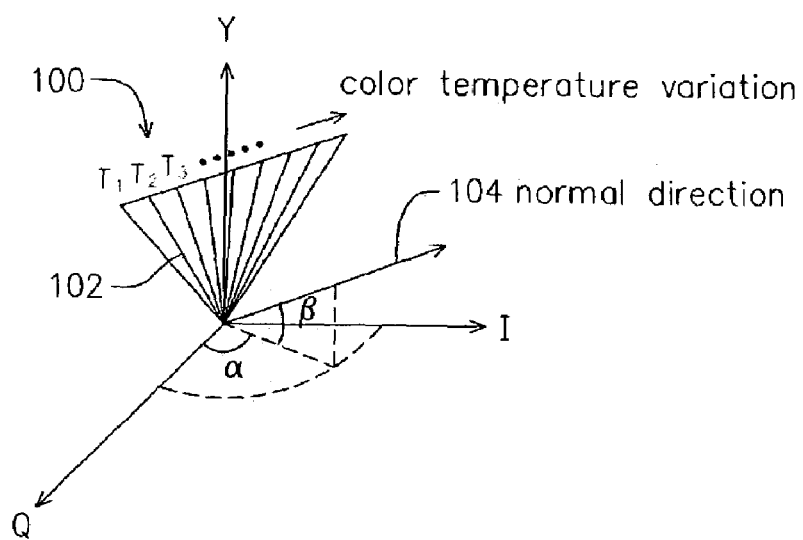
FIG. 3A shows a white-point plane in a YIQ color coordinate.
Figure 3B:
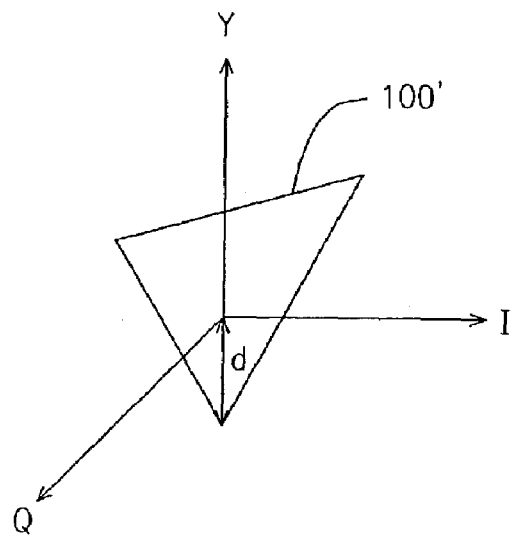
FIG. 3B shows the offset of the white-point plane along Y-axis as shown in FIG. 3A.

As shown in FIG. 3A, the white-point plane 100 has a normal direction 104, which is inclined by an angle α and an angle β in a polar coordinate in which the Y-axis can be represented by the Z-axis. In fact, any of the Y, I, and Q axes can be used as the Z-axis in the polar coordinate. The presentation in FIG. 3A is only an exemplary option. In addition, as shown in FIG. 3B, as the actual physical characteristic indicated by the Y-axis is positive, the white-point plane 100 can be displaced towards the negative direction by a distance d to avoid numerical overflow. Theses are all design choices without affecting the estimation of relative deviation of the white-point plane.

Figure 4A:
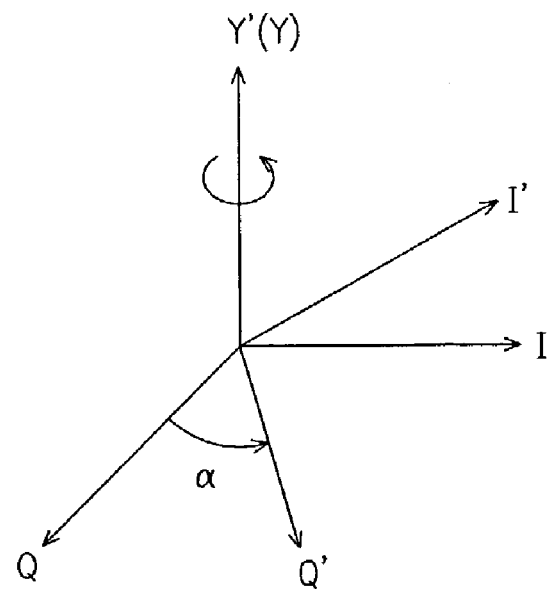
FIGS. 4A and 4B shows the mechanism for performing two coordinate rotation according to the normal direction of the white-point plane.
Figure 4B:
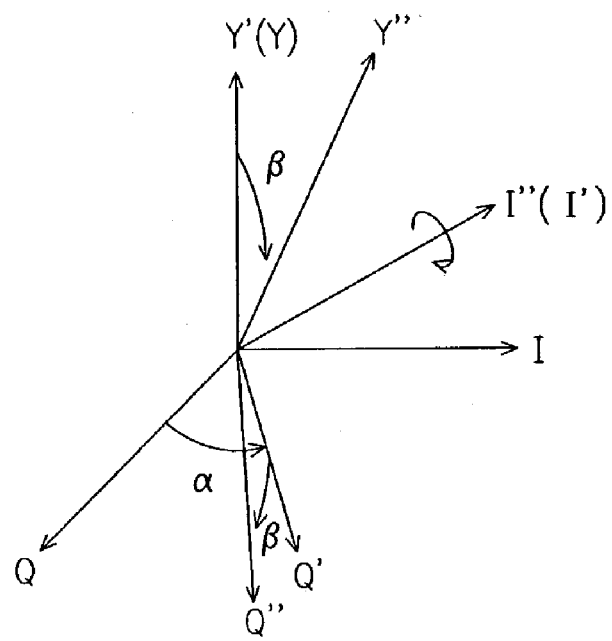

FIGS. 4A and 4B shows the method to obtain the distance between the color point to be analyzed and the white-point plane 100. As shown in FIGS. 4A and 4B, a rotation operation is performed to adjust the normal direction 104 and the Y-axis into the same direction. In mathematics, such rotation operation can be achieved by Euler angle rotation. In FIG. 4A, the Y-axis is rotated by an angle α, and the rotated coordinated is denoted as Y"I"Q" color coordinate. In FIG. 4B, the I"-axis of the Y"I"Q" color coordinate is further rotated by an angle β as the Y"'I"'Q" color coordinate. For certain specific requirement or condition such as to perform transformation between the YIQ and YUV color coordinates, the Y"'-axis can be further rotated. However, in the present invention, the rotation is performed for obtaining the distance between the color point and the white-point plane, such that the third rotation is not required.

Figure 5:
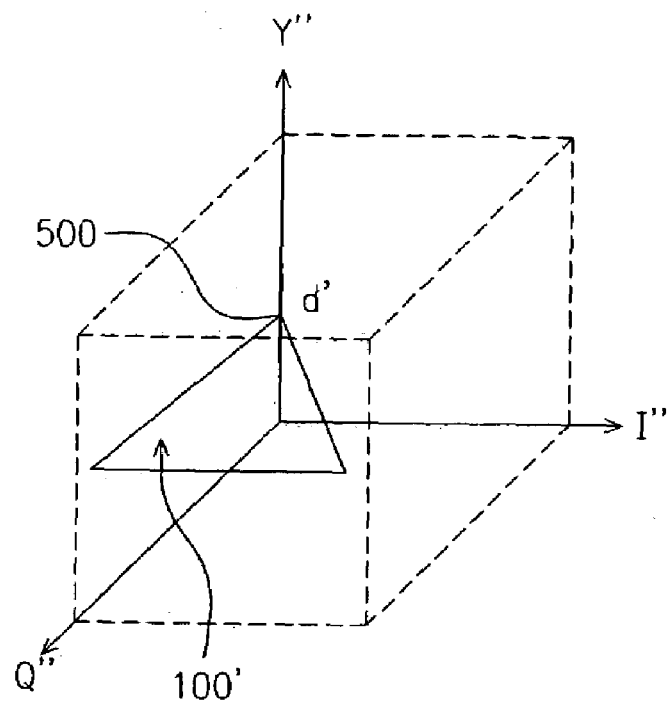
FIG. 5 shows the position of the white-point plane in the rotated coordinate.
Figure 6:
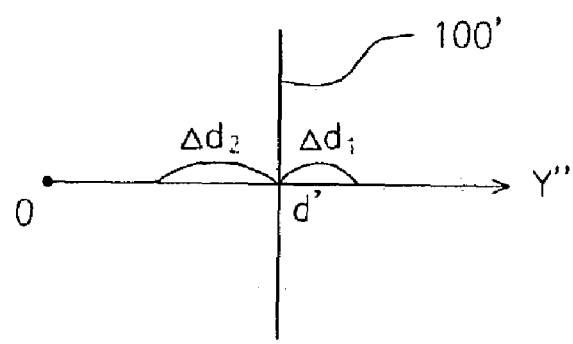
FIG. 6 shows the position of white-point plane relative the Y-axis of the rotated coordinate.
Figure 7:
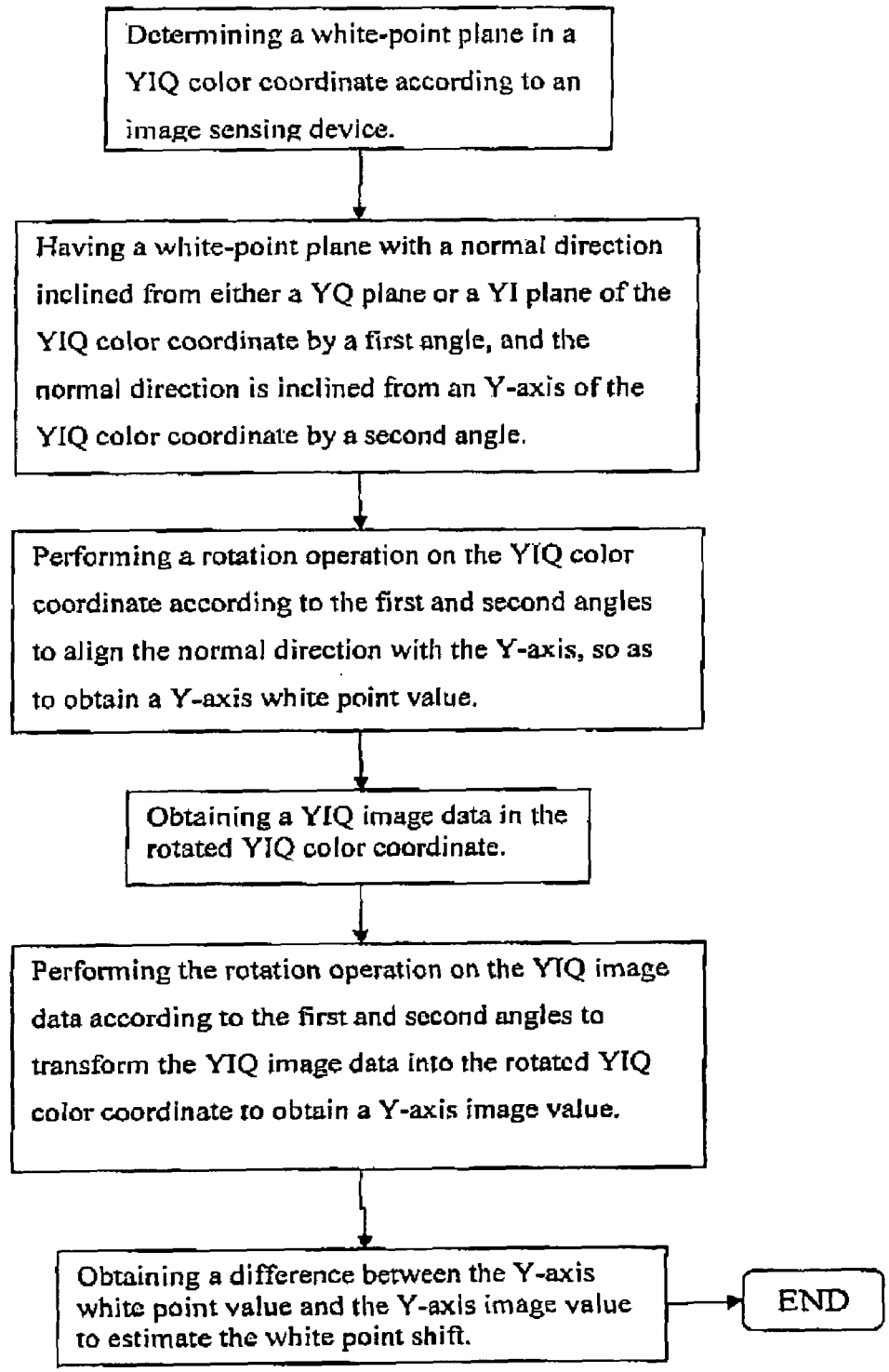
FIG. 7 shows steps of the estimation method provided by the present invention.

By performing the rotations as shown in FIGS. 4A and 4B, the normal direction 104 is aligned with the Y"-axis, such that the white-point plane 100 is perpendicular to the Y"-axis. Referring to FIG. 5, the white-point plane 100" is parallel to the I"Q" plane, where the white-point plane 100 is located at the d" position 500 of the Y" axis. Referring to FIG. 3B, as the white-plane plane 100" has been displaced along the Y-axis by a distance d, which is then converted into distance d" in FIG. 5. If d is zero, d' is zero, and d' is the position of the white-point plane 100 on the Y"-axis. Therefore, the distance between a color point and the white-point plane 100' in the Y"I"Q" color coordinate can be calculated only by comparing the Y"-axis value and d'. The distance between the color point to be analyzed and calibrated and the white-point plane 100" is either Δ d1 or Δ d2. According to the color calibration mode, the magnitude of offset and the shift, a weighting value can be determined. When there is no offset, d" is equal to zero.

In the actual operation, the offset d is set as the origin 128. The actual YIQ numeral range is Y=[0,255], I=[−128,127] and Q=[−128,127]. According to equation (1), one can obtain $$Y = (77R + 150G + 29B)/256$$

$$I = (128R - 59G - 69B)/256$$

$$Q = (52R - 128G + 76B)/256 \quad (3),$$

Once the RGB color coordinate is transformed into the YIQ color coordinate by the transformation in equation (3), a first rotation can be performed on the Y-axis as:

$$Y' = Y - 128$$

$$I' = I \cos \theta + Q \sin \theta$$

$$Q' = -I \sin \theta + Q \cos \theta \quad (4)$$

The Q-axis can be rotated further to compensate the offset d=128 as:

$$Y'' = Y' \cos \theta + I' \sin \theta + 128$$

$$I'' = -Y' \sin \theta + I' \cos \theta$$

$$Q'' = Q$$

After the rotations, the shift of the white point can be easily computed. Therefore, only a comparator is required in hardware design, and the circuit design for automatic color calibration can be greatly simplified.

The present invention uses the special physical characteristic of white balance point in the YIQ/YUV color coordinate to construct a white point plane as a function of color temperature. The white point shift can thus be simplified to the computation of distance between the color point and the white point. Further, the rotation operation converts the three-dimensional distance computation into a one-dimensional computation along the Y"-axis. Therefore, the hardware design is simplified, while the accurate automation calibration is achieved. It is appreciated that the present invention may be performed by rotating the I- or Q-axis into the Z-axis with the same rotation operation. Further, the sequence of rotation is also adjustable. The purpose is to rotate the normal direction of the white-point plane aligned with the Z-axis in the polar coordinate.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

The invention claimed is:

1. A method of estimating white point shift, comprising:
   determining a white-point plane in a YIQ color coordinate according to an image sensing device, wherein the white-point plane has a normal direction inclined from either a YQ plane or a YI plane of the YIQ color coordinate by a first angle, and the normal direction is inclined from an Y-axis of the YIQ color coordinate by a second angle;
   performing a rotation operation on the YIQ color coordinate according to the first and second angles to align the normal direction with the Y-axis, so as to obtain a Y-axis white point value;
   obtaining a YIQ image data in the rotated YIQ color coordinate;
   performing the rotation operation on the YIQ image data according to the first and second angles to transform the YIQ image data into the rotated YIQ color coordinate to obtain a Y-axis image value; and
   obtaining a difference between the Y-axis white point value and the Y-axis image value to estimate the white point shift.

2. The method according to claim 1, wherein the step of performing a rotation operation on the YIQ color coordinate further comprises displace the Y-axis thereof.

3. The method according to claim 1, where the step of obtaining the difference further comprises determining a weighting value according to the difference and a calibration mode.

4. The method according to claim 1, further comprising transforming an image in the RGB color coordinate into the YIQ image data in the YIQ color coordinate.

5. The method according to claim 1, further comprising transforming an image in the YCM color coordinate into the YIQ image data in the YIQ color coordinate.

6. The method according to claim 1, further comprising transforming an image in a color coordinate into the YIQ image data in the YIQ color coordinate.

7. A method of estimating white point shift, comprising:
   selecting a first color coordinate in which a plurality of white points is located on a single plane as a function of color temperature;
   rotating the first color coordinate until the plane of white points is perpendicular to one selected axis of the first color coordinate, such that the white points have a substantially identical coordinate value of the selected axis;
   obtaining a coordinate value of the selected axis of a color point to be calibrated; and
   obtaining the white point shift by a difference between the coordinate values of the white points and the color point of the selected axis.

8. The method according to claim 7, wherein the first color coordinate includes a YIQ color coordinate or a YUV color coordinate.

9. The method according to claim 7, wherein the step of obtaining a coordinate value of the selected axis of a color point to be calibrated further comprising:
   obtaining an image including a plurality of color points in the first color coordinate; and
   rotation the first color coordinate until a plane of the color points is perpendicular to the selected axis.

10. The method according to claim 9, wherein the step of obtaining an image further comprises:
   obtaining an image in a second color coordinate different from the first color coordinate; and
   transforming the image from the second color coordinate to the first color coordinate.

11. A method for estimating white point shift, comprising:
   determining a white-point plane in a YIQ/YUV color coordinate according to characteristic of an image sensing device, the white-point plane having a normal direction;
   performing a rotation operation to make the normal direction of the white-point plane perpendicular to one axis axis of the YIQ/YUV color coordinate, such that the white-point plane is perpendicular to the coordinate with a one-dimensional white-point value;
   obtaining a YIQ/YUV image data in the YIQ/YUV color coordinate;
   performing the rotation operation to rotate the YIQ/YUV image data to obtain a one-dimensional image value; and
   calculating a difference between the one-dimensional white-point value and the one-dimensional image value to estimate the white point shift.

12. The method according to claim 11, further comprising transforming an image of an RGB color coordinate into the YIQ/YUV image data.

13. The method according to claim 11, further comprising transforming an image of an RGB color coordinate into the YIQ/YUV image data.

* * * * *